United States Patent

[11] 3,585,492

[72] Inventor Owen J. McCabe
Bristol, Conn.
[21] Appl. No. 821,613
[22] Filed May 5, 1969
[45] Patented June 15, 1971
[73] Assignee The Superior Electric Company
Bristol, Pa.

[54] AUTOMATIC VOLTAGE REGULATION RESPONSIVE TO INPUT VOLTAGE VARIATIONS
4 Claims, 2 Drawing Figs.

[52] U.S. Cl. ................................................ 323/43.5, 323/45
[51] Int. Cl. .................................................... H02p 13/06, H01f 29/02
[50] Field of Search .......................................... 323/43.5, 45; 317/32; 318/283, 286, 287, 290

[56] References Cited
UNITED STATES PATENTS
| 3,155,879 | 11/1964 | Casey et al. | 317/32 |
| 3,202,903 | 8/1965 | Riebs | 323/43.5 |
| 3,226,628 | 12/1965 | Kupferberg et al. | 323/43.5 |
| 3,312,891 | 4/1967 | McCabe et al. | 323/43.5 |

Primary Examiner—Gerald Goldberg
Attorney—Johnson & Kline

ABSTRACT: An adjustable voltage system for providing a substantially constant value of output voltage with variations in the input voltage in which the regulator has a mechanically movable regulating unit, such as an adjustable voltage autotransformer that is controlled by a reversible motor. The motor control circuitry is composed of solid state components which serve to sense the direction of the deviation of the value of output voltage from a preselected value and actuate the motor in a direction which overcomes the deviation.

INVENTOR.
Owen J. McCabe
BY
Johnson and Kline
ATTORNEYS

AUTOMATIC VOLTAGE REGULATION RESPONSIVE TO INPUT VOLTAGE VARIATIONS

In U.S. Pat. Nos. 3,241,047 and 3,312,891, both assigned to the assignee of the present invention, there are disclosed voltage circuits which function to maintain a substantially constant value of an output voltage. Both circuits utilize an adjustable voltage autotransformer that is mechanically actuated by a reversible electric motor. The motor has one channel which when energized causes movement in one direction and another channel which when energized, effects movement in the reverse direction. When neither channel is energized, the motor remains stationary. The motor shaft is connected to the movable autotransformer brush and thus, to increase or decrease the value of the output voltage to the desired value, one of the channels is energized until the value of output voltage is essentially at the desired value. The motor is then deenergized.

A motor control circuit is employed to control the energization of the motor and in both embodiments disclosed in the above-noted patents there is included a mechanical switching relay. Thus, though these circuits have been found satisfactory, they are inherently subject to failure by reason of the mechanical switching. Moreover, such relay structure tends to render the circuits relatively expensive and not especially compatible to use with printed circuits.

It is accordingly an object of the present invention to provide an automatic voltage control system that has a motor control circuit that is inherently trouble free and is composed of solid-state, nonmechanical components.

Another object of the present invention is to achieve the above object with a motor control circuit that is quite accurate even over a wide ambient temperature range.

A further object of the present invention is to achieve the above objects with a motor control circuit that is economical to manufacture and is mostly formed of components that are mountable on a printed circuit board.

In carrying out the present invention, the automatic voltage regulator includes an adjustable voltage autotransformer that has a brush which is mechanically coupled to a reversible motor. The output of the regulator is derived from the output of the autotransformer and the value of this output voltage is determined by the mechanical position of the brush. The brush location with respect to its extent of movement sets the proportion of the input voltage which will appear as the output voltage.

The regulator has a motor control circuit which senses the value of the output voltage and compares it against a constant value voltage reference, to provide an error signal to control the operation of the motor if the value of the output voltage varies from its preselected value. The motor has two channels, one which when energized effects a movement to cause the value of output voltage to increase and the other, when energized effecting a movement that causes the value of output voltage to decrease. Each channel includes a semiconductor, specifically a bidirectional controlled rectifier sometimes referred to as a "TRIAC," which controls energization in its motor channel and the conducting signal for each controlled rectifier is obtained by effecting conduction of a transistor. A dual preamplifier-integrated circuit is connected to receive the error signal and will cause one or the other transistor to conduct depending on its sign, with the latter being determined by the direction of the deviation. When the deviation has been eliminated, the error signal drops to a value which will not cause conduction of the transistor and hence terminates energization of the motor.

The motor control circuit is accordingly composed of solid-state components which may be mounted on a printed circuit board. Moreover, as the transistors are connected to their controlled rectifiers through gate coupling transformers, the control circuit is effectively electrically isolated from the motor-energizing circuit.

Other features and advantages will hereinafter appear.

Figure 1:
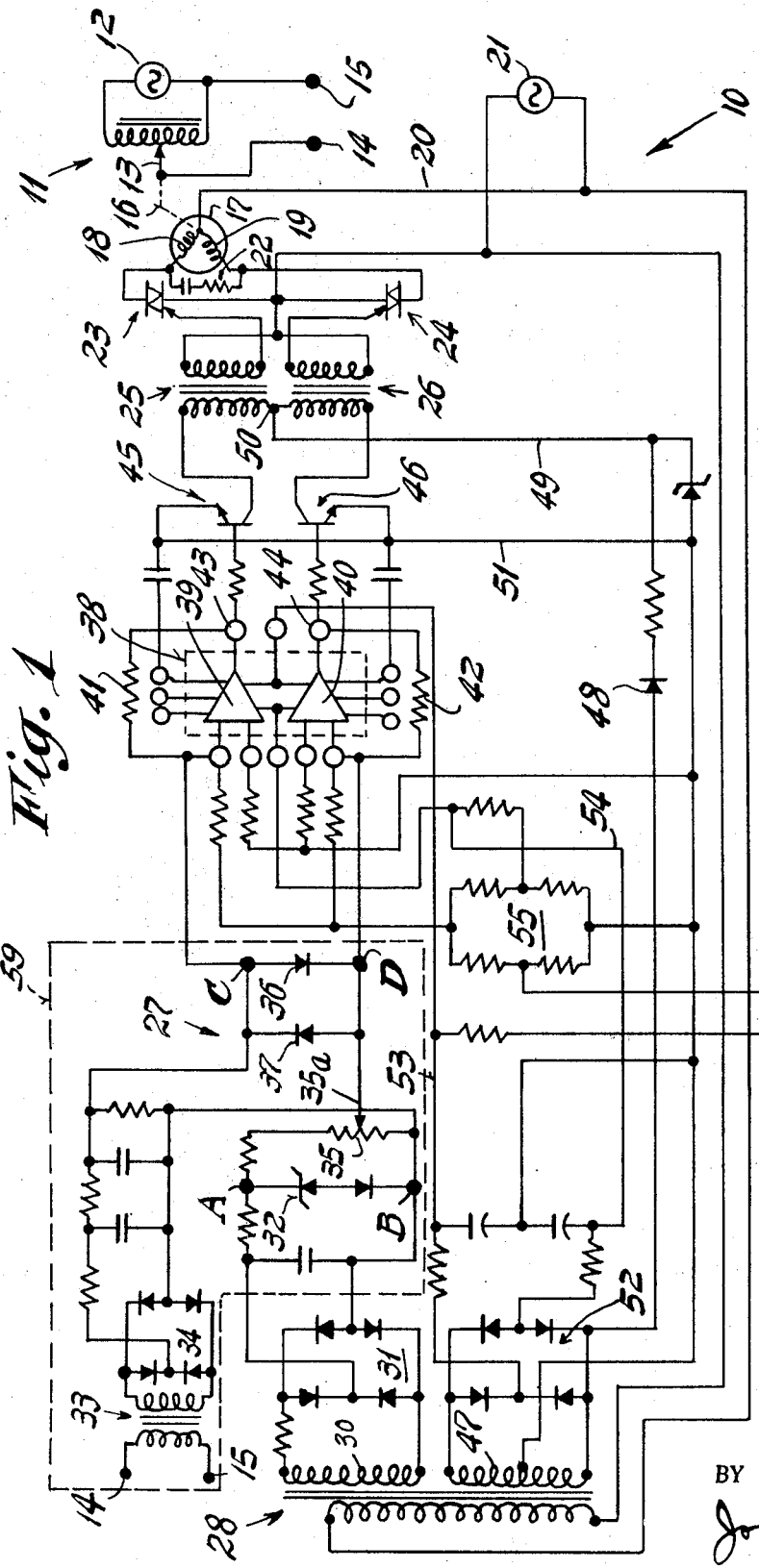
FIG. 1 is a schematic diagram of the voltage system for automatically maintaining a desired value of output voltage over an extended range.

The specific embodiment of the automatic voltage regulator herein disclosed is generally indicated by the reference numeral 10 and includes an adjustable voltage autotransformer 11 having a winding connected across a source of alternating current 12. The autotransformer includes a movable brush 13 and the output of the regulator appears across a pair of output terminals 14 and 15 with the former being connected to the brush and the latter to one side of the source. The brush, as shown by the dotted line 16, is connected to the shaft of a motor 17 so as to be mechanically moved upon rotation of the motor.

The motor 17 is preferably of the type disclosed in U.S. Pat. No. 2,928,872 (assigned to the assignee of the present invention) and includes a first winding 18 and a second winding 19 with the windings having a common junction lead 20. The motor is energized from a source of alternating current 21 (which may be the same source as the source 12), to have only one of the windings 18 or 19 being energized at a time with in-phase AC, while the other is simultaneously energized with out-of-phase AC by means of a phase-shifting network 22. If the winding 19 is energized with in-phase AC, the motor will revolve in a direction which moves the brush 13 to decrease the value of output voltage, while if the winding 18 is energized with in-phase AC, the motor will rotate in the opposite direction, to increase the value of the output voltage. With neither winding energized, the motor remains stationary.

The source 21 is connected directly through a bidirectional controlled rectifier 23 to the winding 18 and another bidirectional controlled rectifier 24 to the winding 19. The conduction of the controlled rectifier 23 is controlled through a first gate coupling transformer 25 while conduction through the controlled rectifier 24 is effected by another gate coupling transformer 26. A voltage pulse through a transformer will initiate conduction of its associated controlled rectifier for the remaining portion of the cycle of AC in which the pulse appears and thus the pulse transformers provide only one pulse at the beginning of each AC cycle to the rectifier when it is required that the motor be energized. One type of controlled rectifier which has been found satisfactory is marketed under the name "TRIAC."

The voltage source 21 is also connected to a motor control circuit, generally indicated by the reference numeral 27, which provides the pulses in the gate-coupling transformers 25 and 26 whenever the output voltage value deviates from the selected value and requires a change of the position of the brush 13 to overcome the deviation. The circuit 27 includes a transformer 28 having a primary winding connected to the AC source 21. A constant voltage reference source is employed to produce a constant voltage across the points A and B and includes a secondary winding 30 of the transformer 28 and a full wave rectifying bridge 31 together with a Zener diode 32.

The reference voltage at the points A and B is compared against a voltage related to the output voltage through a circuit that includes a transformer 33 having its primary windings connected to the output voltage terminals 14 and 15 and its secondary winding connected to a full wave bridge 34. One lead from the bridge 34 is connected to a point C while the other lead is connected to the point B. An adjustable potentiometer 35 is connected across the points A and B and has a tap 35a connected to a point D.

The filtered unidirectional voltage from the bridge 34 and the constant value reference voltage are in opposition with the difference or error signal appearing across the points C and D. The potentiometer 35 serves to adjust the value of the output voltage desired. Accordingly, at the points C and D there will be produced an error signal relative to each other that is a unidirectional voltage and which causes the point C to be —and the point D to be +, if the output voltage value is lower than the desired value. Conversely the point C will be + and the point D−, if the output voltage value is higher than the desired value. The maximum value of the error voltage is limited by a pair of breakover diodes 36 and 37 connected as shown.

In order to provide a pulse in the proper transformer 25 or 26 in accordance with direction of the deviation as set by the sign of the error signal, there is provided an integrated circuit 38 that may be a Motorola-type MC 1303P dual stereo preamplifier. The circuit 38 has a first conductive channel 39 and a second conductive channel 40 with each being independently capable of being rendered conductive. The error signal is applied to the indicated terminals as shown and thus the channel 40 will be rendered conducting when the point D is positive while the channel 39 will be rendered conducting when the point C is positive. As both points C and D cannot be of the same polarity simultaneously, both channels 39 and 40 will not be capable of conducting simultaneously.

Each channel is essentially a linear amplifier and to increase its switching speed there is provided a feedback resistor 41 for the channel 39 and a similar feedback resistor 42 for the channel 40 with the resistors 41 and 42 being connected to the output 43 of the channel 39 and the output 44 of the channel 40, respectively. The output of the channels 39 and 40 are used to control conduction of transistors 45 and 46 with the output 43 of the channel 39 being connected to the base of transistor 45 while the output 44 of the channel 40 is connected to the base of transistor 46. Each transistor 45 and 46 is normally biased to be nonconducting in its emitter-collector path but is capable of being rendered conducting when its associated channel is rendered conducting. The emitter-collector path of the transistor 45 includes the primary winding of the gate-coupling transformer 25 while the emitter-collector path of the transistor 46 includes the primary winding of the gate-coupling transformer 26.

The power for the emitter-collector paths of the transistors 45 and 46 is obtained from a center-tapped winding 47 of the transformer 28. Specifically, the power is pulsating DC obtained by half-wave rectification of AC through the use of a rectifier 48 positioned in a lead 49 connected to a junction 50 that is common to the primary windings of the two transformers 25 and 26. The emitters of the transistors 45 and 46 are connected by a lead 51 to the center tap of the winding 47. Accordingly, whenever either one of the transistors 45 and 46 is rendered conductive, the half-wave unidirectional voltage across the leads 49 and 51 will produce a voltage pulse in the secondary winding of the transformer whose primary winding is connected to the conducting transistor. This pulse will initiate conduction of the associated bidirectional controlled rectifier for the remaining portion of the AC cycle. Preferably, the half-wave voltage is such that it has a sufficiently high voltage at the early part of each AC cycle which is enough to cause conduction of the rectifiers 23 and 24 also in the early part of the cycle and accordingly essentially the full cycle of AC will be impressed across the motor. Moreover, it will be understood that unless the control rectifier receives a pulse for a cycle that it will not conduct for that cycle and accordingly the motor is energized a cycle at a time with each cycle being controlled by the motor control circuit 27.

The winding 47 is also utilized to provide power and bias voltages to the circuit 27 and accordingly has connected thereto a full wave rectifying bridge 52 which produces, through filters, a positive voltage on a lead 53 and a negative voltage on a lead 54 with these voltages being applied to a bias control bridge 55 and also to the positive and negative terminals of the circuit 38. The positive voltage is applied to the bias bridge 55 through an adjustable resistor 56 whose setting controls the sensitivity of the circuit 38 by applying a negative voltage to the terminals of the circuit 38 that are connected to the points C and D. This negative voltage must be overcome by the value of the positive voltage at these terminals before either channel can be rendered conducting.

In the operation of the regulator, the sensitivity control 56 is adjusted to prevent hunting of the output voltage and thus provide a narrow range in which the value of output voltage may fluctuate before the deviation becomes sufficient to require a corrective movement of the motor. The adjustable resistor 35 is set to the value of the output voltage which is desired to be maintained essentially constant. If the value of the output voltage increases above the selected value sufficiently to require a correction, the voltage from the bridge 34 will increase and when compared to the constant reference voltage at the points A and B will result in the point D being positive. This in turn will overcome the negative bias produced by the bias circuit 55 and cause conduction through the channel 40 of the circuit 38. With conduction being initiated, the feedback voltage through the resistor 42 will increase the effective signal to the channel 40 and cause it to conduct its maximum gain. The transistor 46 will, accordingly, also become substantially fully conductive and permit the half-wave voltage in the lead 49 to flow in the primary winding of the transformer 26 which in turn will cause conduction for each cycle of the controlled rectifier 24.

The motor 17 will be energized to move the brush 13 on the autotransformer to decrease the value of the output voltage until the point D will have an insufficient potential to maintain conduction of the channel 40. This, accordingly, prevents conduction of the transistor 46 and also of the controlled rectifier 24 and deenergizes the motor.

It will be understood that whenever one channel of the circuit 38 is rendered conductive that the other channel is positively maintained nonconducting by the relatively negative portion of the error signal being applied to the nonconducting channel.

The above-described embodiment utilizes a feedback circuit for providing a voltage related to the output voltage to produce the error signal. Thus, the output voltage may be adjusted by the potentiometer 35 from substantially zero to the maximum capability of the autotransformer 11.

Figure 2:
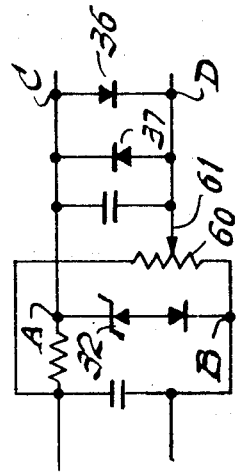
FIG. 2 is a schematic diagram of an alternative control for automatically maintaining a value of output voltage over a limited range.

If desired, the feedback circuit that includes components 33, 34 and 35 may be eliminated if the system is to regulate over a range of voltages that may be ±20 percent of the source voltage. The two sources 21 and 12 are made to be common and the circuit shown in FIG. 2 is substituted for the circuit enclosed within the dotted block 59 of FIG. 1. The circuit includes an adjustable potentiometer 60 connected between the positive lead from the bridge 31 and the point B and will supply a voltage related to the output voltage at its tap 61 that is connected to the point D. The point C is connected to the point A and will have the relatively constant positive potential of the constant reference source applied thereto. The voltage at the point D will change with the value of the output voltage and thus the point C will be positive with respect to the point D when the output voltage is less than the desired value while the converse occurs when the output voltage is higher than the desired value. In the latter situation, as described in the operation of the embodiment shown in FIG. 1, the channel 40 will become energized, causing conduction of the bidirectional controlled rectifier 24, in phase energization of the winding 19 and a brush movement that will decrease the value of the output voltage. This circuit enables the motor control to provide relatively good regulation when the sources 21 and 12 are the same but within a limited range.

The integrated circuit 38 connected as a high-gain switching amplifier will respond to error voltage of small magnitude and thus permits use of a small voltage (5.6 v.) zener diode 32 in the constant reference source. Such a diode has been found to be quite stable over a wide temperature range and thus enables the system to be accurate within such a wide temperature range.

It will accordingly be understood that there has been disclosed an adjustable voltage system that provides an adjustable value of output voltage. The system includes an adjustable voltage autotransformer having a movable brush and the position of the brush sets the value of the output voltage. The brush is moved by a reversible electric motor having a pair of channels with energization of a channel setting the direction of movement of the brush. In accordance with the present invention, each channel contains a semiconductor means that requires a triggering signal to cause it to become conductive for the remainder of the alternating current cycle. A motor control circuit supplies the triggering signal as determined by the deviation of the value of the output voltage from a related value. Thus the electrical system may be made economically of solid-state components to produce an adjustable voltage system that is durable and reliable as well as being accurate and sensitive.

Variations and modifications may be made within the scope of the invention and portions of the improvements may be used without others.

I claim:

1. An adjustable voltage system comprising an adjustable voltage means connectable to a source of alternating current for producing an output voltage and having a mechanical movable means which is movable to adjust the value of the output voltage, a reversible motor connected to said movable means and having a first channel which when energized moves the movable means in a direction to increase the value of output voltage and a second channel which when energized moves the movable means in the other direction to decrease the value of the output voltage, means for controlling the energization of each channel of the motor including a semiconductor means in each channel, each of said semiconductor means being normally nonconducting but being rendered conducting upon receipt of a triggering signal and a motor control circuit having settable means for selecting a desired value of output voltage and for providing a triggering signal to only one of said semiconductor means upon the value of the output voltage deviating from the desired value; in which the motor control circuit includes means for producing an error signal related to the value of the output voltage, said error signal being of one or an opposite polarity and amplifying means for receiving the error signal and producing a triggering signal to one semiconductor means when the error signal is of one polarity and a triggering signal to the other semiconductor means when the signal is of the opposite polarity; in which the amplifying means includes a dual channel integrated amplifier having two independent amplifiers with each amplifier being rendered operative only upon application of a signal of one polarity, the error signal appears across a pair of leads and means applying one lead to one amplifier and the other lead to the other amplifier whereby only the lead having the one polarity is capable of producing a triggering signal by being rendered operative; in which the amplifier means includes a pair of transistors with one transistor being operatively interconnected to one semiconductor means and the other transistor being operatively connected to the other semiconductor means with each operative connection including a pulse transformer and in which said transistors and said pulse transformer are connected to a source of unidirectional pulsating electric power; in which the unidirectional pulsating electric power consists of half-wave rectified alternating current and in which the motor is energized through its semiconductors from a source of alternating current that is substantially in phase with the half-wave rectified alternating current; and in which each semiconductor means is normally nonconducting for each cycle and is rendered conducting only by a triggering pulse that occurs during a half-cycle of the alternating current, in which the semiconductor means maintains conduction for the other half-cycle of the alternating current and in which the triggering signal is applied early in the half-cycle whereby said motor is energized for substantially the complete alternating current cycle.

2. The invention as defined in claim 1 in which the motor control circuit includes means for supplying a unidirectional voltage of substantially constant value, in which there are feedback means for supplying a unidirectional voltage related to the value of the output voltage and in which the circuit includes means for algebraically adding the two voltages to provide an error signal.

3. The invention as defined in claim 2 in which the feedback means includes an adjustable resistor that forms part of the means for selecting the desired value of the output voltage.

4. The invention as defined in claim 2 in which the motor control circuit includes a bias voltage means that opposes said error signal, and includes an adjustable means for setting the value of the bias voltage whereby the extent of deviation of the output voltage which produces a triggering signal may be adjusted.

PO-1050
(5/69)

UNITED STATES PATENT OFFICE
CERTIFICATE OF CORRECTION

Patent No. 3,585,492              Dated   June 15, 1971

Inventor(s)   Owen J. McCabe

It is certified that error appears in the above-identified patent and that said Letters Patent are hereby corrected as shown below:

Title Page - Assignee line, Bristol, Pa. should be Bristol, Conn.

Column 2, line 19, 2,928,872 should be 2,982,872

Signed and sealed this 7th day of December 1971.

(SEAL)
Attest:

EDWARD M. FLETCHER, JR.              ROBERT GOTTSCHALK
Attesting Officer                    Acting Commissioner of Patents